United States Patent
Kray et al.

(10) Patent No.: US 12,535,009 B1
(45) Date of Patent: Jan. 27, 2026

(54) AIRFOIL ASSEMBLY

(71) Applicants: General Electric Company, Cincinnati, OH (US); GE AVIATION SYSTEMS LIMITED, Cheltenham (GB)

(72) Inventors: Nicholas J. Kray, Mason, OH (US); Richard Eugene Klaassen, West Chester, OH (US); Luc The Nguyen, West Chester, OH (US); Arthur W. Sibbach, Boxford, MA (US); Tod W. Davis, Cincinnati, OH (US); Gary W. Bryant, Loveland, OH (US); Pawel Pres, Cheltenham (GB); Joshua Wood, Gloucester (GB); James Alexander Trevarthen, Aldeburgh (GB)

(73) Assignees: General Electric Company, Evandale, OH (US); GE Aviation Systems Limited, Cheltenham (GB)

( * ) Notice: Subject to any disclaimer, the term of this patent is extended or adjusted under 35 U.S.C. 154(b) by 0 days.

(21) Appl. No.: 19/052,888

(22) Filed: Feb. 13, 2025

(51) Int. Cl.
| | |
|---|---|
| *F01D 5/30* | (2006.01) |
| *F01D 5/14* | (2006.01) |
| *F04D 29/32* | (2006.01) |
| *F04D 29/38* | (2006.01) |

(52) U.S. Cl.
CPC .......... *F01D 5/3023* (2013.01); *F01D 5/147* (2013.01); *F04D 29/324* (2013.01); *F04D 29/388* (2013.01)

(58) Field of Classification Search
CPC ........... F01D 5/282; F01D 5/30; F01D 5/3023
See application file for complete search history.

(56) References Cited

U.S. PATENT DOCUMENTS

| | | | |
|---|---|---|---|
| 3,752,600 A | 8/1973 | Walsh | |
| 4,884,948 A | 12/1989 | Sikorski | |
| 4,892,462 A | 1/1990 | Barbier | |
| 5,720,597 A | 2/1998 | Wang | |
| 10,774,660 B2 | 9/2020 | Luczak | |
| 11,846,192 B1* | 12/2023 | Xie | F01D 5/282 |
| 11,913,408 B1 | 2/2024 | Daggett | |
| 12,025,030 B2* | 7/2024 | Souryavongsa | B29C 70/48 |
| 12,134,460 B2* | 11/2024 | Joudon | B29D 99/0025 |
| 12,173,725 B2* | 12/2024 | Joudon | F01D 5/147 |
| 2008/0170943 A1* | 7/2008 | Cairo | F04D 29/023 416/224 |
| 2010/0061858 A1* | 3/2010 | Jones | F04D 29/023 29/889 |
| 2017/0002661 A1 | 1/2017 | Opderbecke | |
| 2019/0301290 A1* | 10/2019 | Kamiya | B29C 70/70 |
| 2019/0323357 A1* | 10/2019 | Courtier | B64C 11/30 |
| 2024/0352862 A1* | 10/2024 | Kray | F01D 5/32 |

FOREIGN PATENT DOCUMENTS

WO   2015069344 A1   5/2015

* cited by examiner

*Primary Examiner* — Courtney D Heinle
*Assistant Examiner* — Cameron A Corday
(74) *Attorney, Agent, or Firm* — McGarry Bair PC

(57) ABSTRACT

An airfoil assembly having a trunnion and a spar. The trunnion having an inner surface defining a socket with a flared section with an open top. The spar extending from the socket and through the open top. Further, the spar being formed by a plurality of composite plies including a radially innermost ply having a respective centerline, and a radially outermost ply having a respective centerline that is parallel to the respective centerline of the radially innermost ply.

20 Claims, 4 Drawing Sheets

AIRFOIL ASSEMBLY

TECHNICAL FIELD

The disclosure generally relates to an airfoil assembly, and more specifically to an airfoil assembly having a trunnion and a spar.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section and the turbine section, respectively. The rotation of the rotating blades imparts mechanical stresses along various portions of the blade; specifically, where the blade is mounted to the disk.

In some turbine engines, a variable pitch airfoil can be included, which can be selectively rotated to adjust or otherwise tailor the flow of fluid over the variable pitch airfoil. The variable pitch airfoil is movable through use of a trunnion and a spar. The trunnion can rotate about a rotational axis, which in turn rotates the spar and the variable pitch airfoil. The trunnion is coupled to or otherwise formed with the spar.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
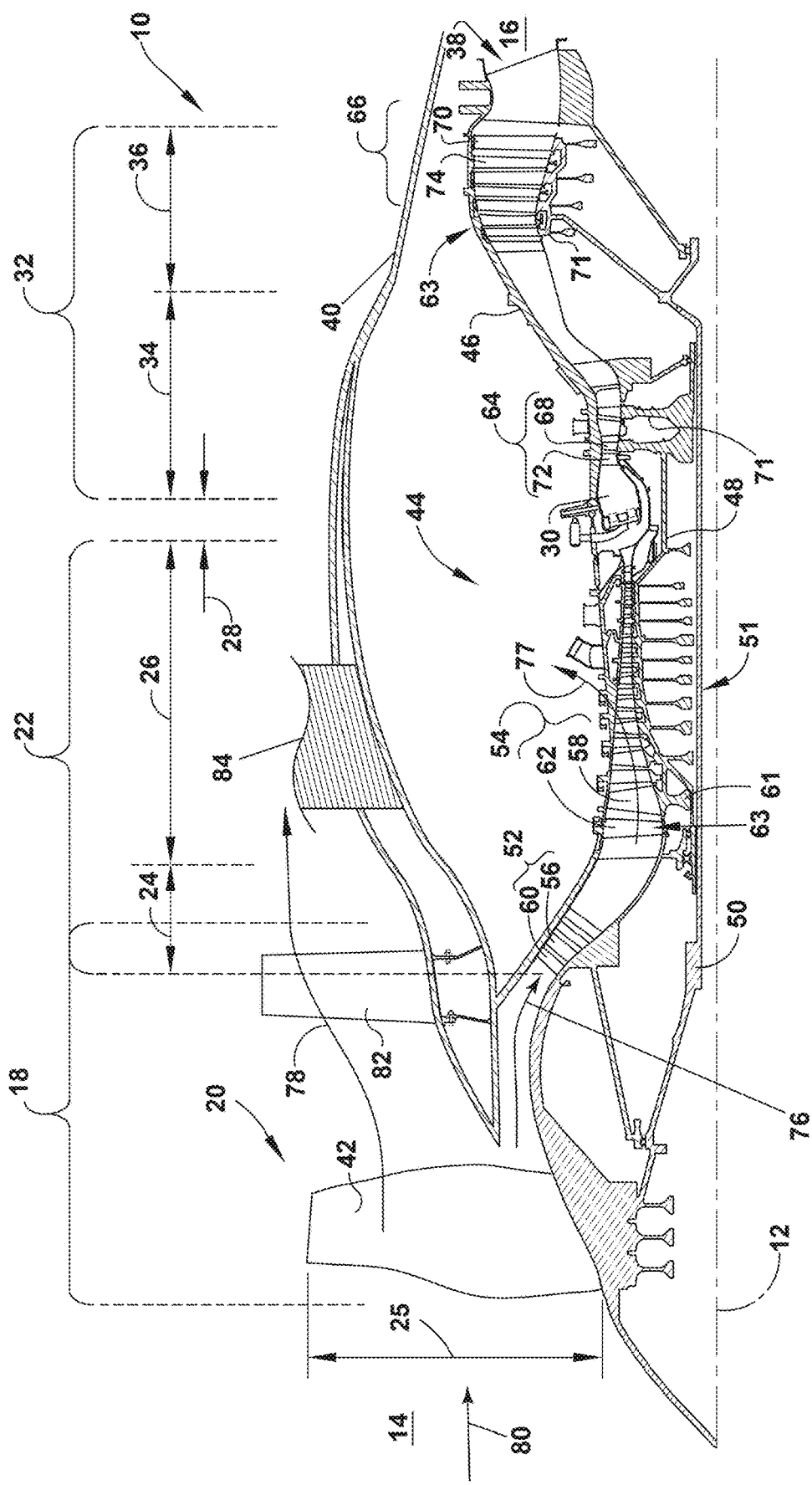
FIG. 1 is a schematic cross-sectional view of a turbine engine in accordance with an exemplary embodiment of the present disclosure.

Aspects of the disclosure herein are directed to an airfoil assembly for a turbine engine. The airfoil assembly includes an airfoil body, a spar, and a trunnion. The spar couples the airfoil to the trunnion. The spar includes a flared section. The spar is at least partially formed by a plurality of composite plies. Specifically, at least the flared section is formed by a respective portion of the plurality of composite plies.

The plurality of composite plies and the trunnion are oriented to allow for non-destructive evaluation of a respective portion of the airfoil assembly. As used herein, "non-destructive evaluation" refers to any method of imaging or otherwise inspecting the airfoil assembly without requiring destruction of (e.g., tearing apart, cutting, etc.) the airfoil assembly. Non-destructive evaluation methods include, but are not limited to, magnetic resonance imaging, X-ray imaging, ultrasound imaging, acoustic imaging, eddy current imaging, thermography, or non-imaging acoustic methods such as contact A-scan or a tap test. For purposes of illustration, the present disclosure will be described with respect to an airfoil assembly for a turbine engine, specifically a fan blade of the turbine engine. It will be understood, however, that aspects of the disclosure described herein are not so limited and can have general applicability within other engines or within other portions of the turbine engine. For example, the disclosure can have applicability for an airfoil assembly in other engines or vehicles, and can be used to provide benefits in industrial, commercial, and residential applications. As a non-limiting example, the disclosure can have applicability towards an airfoil having a spar and trunnion located within an electric engine.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or "a set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. As a non-limiting example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked composite plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, unidirectional material, stitched material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10, specifically an open rotor or unducted turbine engine for an aircraft although the disclosure is not so limited. The turbine engine 10 has a generally longitudinally extending axis or engine centerline 12 extending from a forward end 14 to an aft end 16. The turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing or nacelle 40, of the turbine engine 10 extends from the forward end 14 of the turbine engine 10 toward the aft end 16 of the turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the turbine engine 10. Specifically, the fan section 18 extends radially outward from the nacelle 40. The fan section 18 includes a set of fan blades 42, and a set of fan vanes 82 downstream the set of fan blades 42, both disposed radially from and circumferentially about the engine centerline 12. The set of fan blades 42 and the set of fan vanes 82 extend radially outward from respective portions of the nacelle 40. As such, the set of fan blades 42 and the set of fan vanes 82 can be defined as an exterior set of fan blades 42 and an exterior set of fan vanes 82, respectively. The turbine engine 10 includes any number of one or more sets of rotating blades or propellers (e.g., the set of fan blades 42) disposed upstream of the set of fan vanes 82. As a non-limiting example, the turbine engine 10 can include multiple sets of fan blades 42 or set of fan vanes 82. The turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the turbine engine 10.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline 12 and coupled to a set of rotatable elements, which collectively define a rotor 51.

It will be appreciated that the turbine engine 10 is either a direct drive or integral drive engine. The turbine engine 10 can include reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor section 22 are mounted to a disk 61, which is mounted to the corresponding one of the HP and LP spools 48, 50, with each stage having its own disk 61. The static compressor vanes 60, 62 for a stage of the compressor section 22 are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage of the set of turbine stages 64, 66, multiple turbine blades 68, 70 are provided in a ring and extend radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are mounted to the engine casing 46 in a circumferential arrangement.

Rotary portions of the turbine engine 10, such as the compressor blades 56, 58, and the turbine blades 68, 70 among the compressor section 22 and the turbine section 32 are also referred to individually or collectively as the rotor 51. As such, the rotor 51 refers to the combination of rotating elements throughout the turbine engine 10.

Complementary to the rotary portions, the stationary portions of the turbine engine 10, such as the static compressor vanes 60, 62 and static turbine vanes 72, 74 among the compressor section 22 and the turbine section 32 are also referred to individually or collectively as a stator 63. As such, the stator 63 refers to the combination of non-rotating elements throughout the turbine engine 10.

The nacelle 40 is operatively coupled to the turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the turbine engine 10. The turbine engine includes a pylon 84. The pylon 84 mounts the turbine engine 10 to an exterior structure (e.g., a fuselage of an aircraft, a wing, a tail wing, etc.).

It will be appreciated that the turbine engine 10 can be split into at least two separate portions; a rotor portion and a stator portion. The rotor portion can be defined as any portion of the turbine engine 10 that rotates about a respective rotational axis. The stator portion can be defined by a combination of non-rotating elements provided within the turbine engine 10. As a non-limiting example, the rotor portion can include the set of fan blades 42, the compressor blades 56, 58, or the turbine blades 68, 70. As a non-limiting example, the stator portion can include the set of fan vanes 82, the static compressor vanes 60, 62, or the static turbine vanes 72, 74. It will be appreciated that in some turbine engines 10, such as a counter-rotating turbine engine, at least a portion of the turbine engine can include a first rotor and a second rotor that rotates counter the first rotor.

During operation of the turbine engine 10, a freestream airflow 80 flows against a forward portion of the turbine engine 10. A first portion of the freestream airflow 80 flows along the nacelle 40 and over the set of stationary fan vanes 82 as an exterior airflow 78. The exterior airflow 78 flows past the set of stationary fan vanes 82, following the curvature of the nacelle 40 and toward the exhaust section 38. A second portion of the freestream airflow 80 enters an annular area 25 defined by a swept area between an outer surface of the nacelle 40 and the tip of the fan blade 42, with this air flow being a working airflow 76. A portion of the working airflow 76 enters the engine core 44 and used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the turbine engine 10.

The working airflow 76 and at least some of the exterior airflow 78 merge downstream of the exhaust section 38 of the turbine engine 10. The working airflow 76 and the exterior airflow 78, together, form an overall thrust of the turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
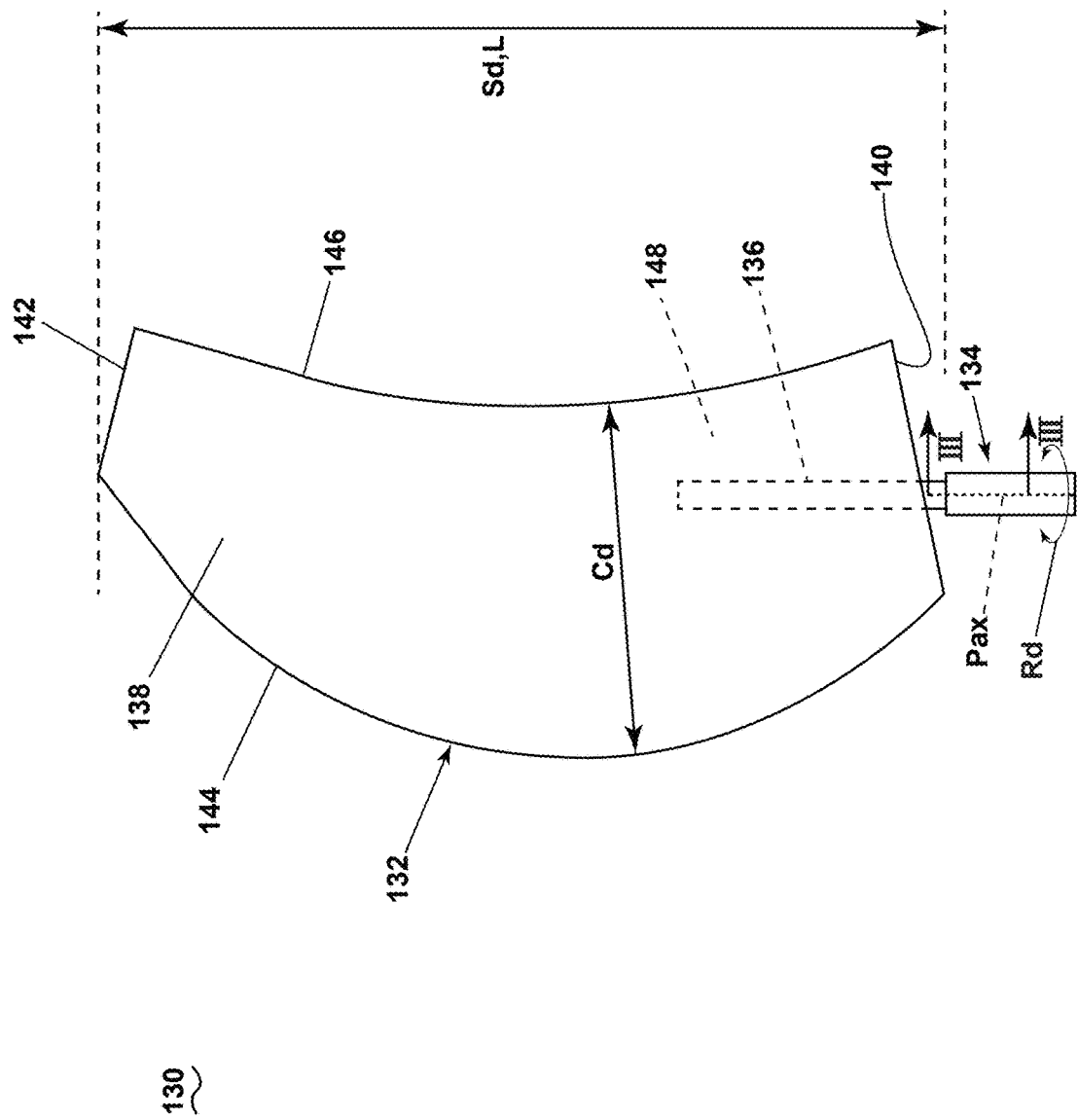
FIG. 2 is a schematic illustration of an airfoil assembly suitable for use within the turbine engine of FIG. 1, the airfoil assembly including an airfoil body, a trunnion, and a spar.

FIG. 2 is schematic illustration of an airfoil assembly 130 suitable for use within the turbine engine 10 of FIG. 1. The airfoil assembly 130 includes an airfoil body 132, a trunnion 134 and a spar 136. The airfoil body 132 is any suitable airfoil of a turbine engine (e.g., the turbine engine 10). As a non-limiting example, the airfoil body 132 can be, but is not limited to, a blade of the set of fan blades 42, or a blade from the compressor blades 56, 58 or the turbine blades 68, 70. It is contemplated that the airfoil body 132 can be a blade, vane, airfoil, or other component of any engine, such as, but not limited to, a gas turbine engine, a turboprop engine, a turboshaft engine, a ducted turbofan engine, an electric engine, a counter-rotating turbine engine, an unducted turbofan engine or an open rotor turbine engine.

The airfoil body 132 includes an outer wall 138 bounding an interior 148. The outer wall 138 extends between a leading edge 144 and a trailing edge 146 to define a chordwise direction (Cd). The outer wall 138 extends between a root 140 and a tip 142 to define a spanwise direction (Sd). The airfoil body 132 has a span length (L) measured along the spanwise direction (Sd) from the root 140 at 0% the span length (L) to the tip 142 at 100% the span length (L).

The outer wall 138 includes any suitable material. As a non-limiting example, the wall can be a composite wall made of one or more layers of composite material. The one or more layers of composite material can be applied during the same stage or different stages of the manufacturing of the airfoil body 132. By way of non-limiting example, outer wall 138 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers.

The trunnion 134 is provided exterior the airfoil body 132. The trunnion 134 is any suitable assembly or component that is adapted to receive a respective portion of the spar 136.

The spar 136 and the trunnion 134 include any suitable material. Specifically, at least a portion of the spar 136 includes a composite material. The trunnion 134 can include any suitable material such as, but not limited to, a metallic material or a composite material. It will be appreciated that the term composite material can further include metals but with a composite architecture (e.g., a metal matrix composite). In the case of a composite material, the spar 136 and/or the trunnion 134 can be any suitable composite material such as a 2D or 3D composite, a laminate skin, a woven or a braided composite, or any other suitable composite.

The spar 136 is coupled to the airfoil body 132 within the interior 148. The spar 136 extends outwardly from the root 140 in the spanwise direction (Sd). The spar 136 is coupled to the trunnion 134. The spar 136 couples the trunnion 134 to the airfoil body 132. An entirety of the spar 136 can be located below 20% of the span length (L). Alternatively, the spar 136 can extend past 20% of the span length (L).

During operation of the airfoil assembly 130, the trunnion 134 can rotate about a pitch axis (Pax) in a rotational direction (Rd). As the spar 136 couples the trunnion 134 to the airfoil body 132, rotation of the trunnion 134 in the rotational direction (Rd) causes the airfoil body 132 to rotate about the pitch axis (Pax). This rotation can be used to control the pitch of the airfoil assembly 130 such that the airfoil assembly 130 is defined as a variable pitch airfoil assembly. The pitch of the airfoil assembly 130 can be varied based on the operation or intended operation of the turbine engine (e.g., the turbine engine 10 of FIG. 1) that the airfoil assembly 130 is provided on.

Figure 3:
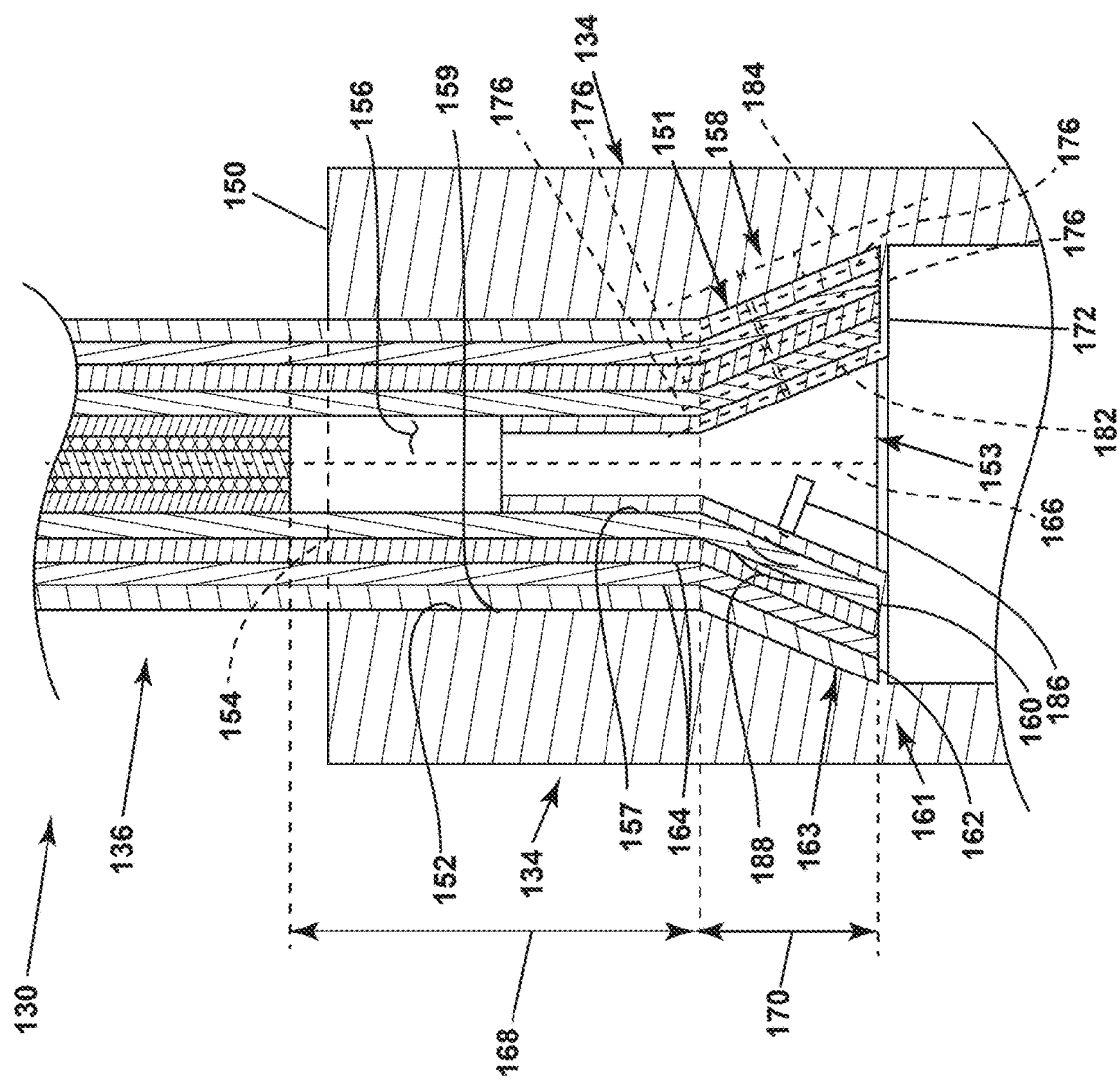
FIG. 3 is a schematic cross-sectional view of the airfoil assembly as seen from sectional line III-III of FIG. 2, further illustrating a set of composite plies forming a respective portion of the spar.

FIG. 3 is a schematic cross-sectional view of the airfoil assembly 130 as seen from sectional line III-III of FIG. 2. The airfoil body 132 (FIG. 2) is removed from the airfoil assembly 130 for illustrative purposes.

The trunnion 134 includes a top surface 150 and an inner surface 152. The inner surface 152 defines a socket 153. The socket 153 has an opening 154 formed along the top surface 150. The inner surface 152, and thus the socket 153, has any suitable formation. As a non-limiting example, the inner surface 152 includes a tapered section 151 defining a region of the socket 153 that has an increasing volume. As such, the socket 153 can be defined as a flared socket.

The spar 136 includes a spar centerline 166. The spar 136 terminates axially along the spar centerline 166 at a distal end 161. The spar includes a flared section 158. The flared section 158 is defined as a region of the spar 136 that flares radially outward with respect to the spar centerline 166. The spar 136 includes a spar interior surface 157. The spar 136 includes a spar exterior surface 159. The spar interior surface 157 is provided radially inward from the spar exterior surface 159. The spar interior surface 157 can define a spar cavity 156 extending axially through a respective portion of the spar 136. The spar cavity 156 opens along the distal end 161. The spar cavity 156 extends through any suitable portion of the spar 136. As a non-limiting example, the spar cavity 156 extends axially, with respect to the spar centerline 166, past the opening 154.

The spar 136 includes a plurality of composite plies 163. The plies of the plurality of composite plies 163 form the spar 136 and are provided in any suitable form. As a non-limiting example, the plies of the plurality of composite plies 163 are stacked on top of one another, and subsequently bonded or otherwise cured together to form a unitary body forming at least a portion of the spar 136. The plies of the plurality of composite plies 163, as illustrated, are radially stacked, with respect to the spar centerline 166. As a non-limiting example, the spar 136 can be a 3D woven preform.

The plurality of composite plies 163 includes any number of two or more plies. The plurality of composite plies 163 includes, at least, a radially innermost ply 160 and a radially outermost ply 162. As used herein, the radially innermost ply 160 is a ply of the plurality of composite plies 163 radially nearest the spar cavity 156 along the flared section 158. As used herein, the radially outermost ply 162 is a ply of the plurality of composite plies 163 radially farthest from the spar cavity 156 along the flared section 158. It will be appreciated that the plurality of composite plies 163 can include a set of intervening plies 164 radially sandwiched between the radially innermost ply 160 and the radially outermost ply 162. The set of intervening plies 164 can include any number of composite plies 163.

It will be appreciated that the plurality of composite plies 163 extends along any suitable portion of the spar 136. As a non-limiting example, the radially outermost ply 162 and the radially innermost ply 160 can extend across and an entirety of an axial length of the spar 136. The spar 136 can have any suitable shape. As a non-limiting example, at least a portion of the spar 136 within the socket 153 can be annular. It will be appreciated that the spar 136 is annular. Put another way, the spar cavity 156 can be annular. As such, the radially innermost ply 160 can be defined by a single ply that is wrapped around the region denoted by the spar cavity 156. Similarly, the radially outermost ply 162, or any other ply of the plurality of composite plies 163 can be wrapped or otherwise form an annulus about the spar centerline 166. The spar cavity 156 extends a cavity axial length 168 with respect to the spar centerline 166. The flared section 158 extends a flared section axial length 170 with respect to the spar centerline 166. As a non-limiting example, the cavity axial length 168 is greater than the flared section axial length 170.

Each composite ply of the plurality of composite plies is defined by a respective centerline 176. For purposes of illustration, the respective centerline 176 of each of the plurality of composite plies 163 along the flared section 158 is illustrated. The plies of the plurality of composite plies 163 are locally parallel to each other, or non-parallel with a mis-alignment between 0 and 20 degrees. Specifically, the respective centerline 176 of each ply of the composite plies 163 is locally parallel to each other ply of the composite plies 163. It will be appreciated that the respective centerline 176 of each ply of the plurality of composite plies 163 is linear or non-linear. However, the respective centerline 176 of each ply of the plurality of composite plies 163 is parallel to each other ply of the composite plies 163 regardless of whether or not they are linear or non-linear. It will be appreciated that an angle of the respective centerline 176 is non-zero with respect to the spar centerline 166 along the flared section 158. As a non-limiting example, the respective centerline 176 extends at an angle of greater than or equal to 5 degrees and less than or equal to 45 degrees along the flared section 158 with respect to the spar centerline 166. In a non-limiting example, the respective centerline 176 extends at an angle of greater than or equal to 12 degrees and less than or equal to 35 degrees along the flared section 158 with respect to the spar centerline 166.

The airfoil assembly 130 includes an inner sleeve 172. The inner sleeve 172 includes any suitable material. As a non-limiting example, the inner sleeve 172 includes a metallic material.

The spar 136 extends through the opening 154 and into the socket 153. The spar 136 terminates at the distal end 161 within the socket 153. The spar cavity 156 opens to the socket 153. The inner sleeve 172 extends along at least a portion of the spar 136. As a non-limiting example, the inner sleeve 172 extends along at least a portion of the radially innermost ply 160. The inner sleeve 172 is provided radially between the spar cavity 156 and a respective portion of the radially innermost ply 160. As a non-limiting example, the inner sleeve 172 extends along the radially innermost ply 160 corresponding to at least the flared section 158. The inner sleeve 172 can extend along the distal end 161. The inner sleeve 172 is coupled to or integrally formed with the trunnion 134; specifically, the spar 136 is sized to fit within the region between the inner sleeve 172 and the inner surface 152 of the trunnion 134. The spar 136 can be coupled to or otherwise held in frictional contact with the inner sleeve 172 and the inner surface 152 of the trunnion 134. Put another way, the inner sleeve 172 effectively couples the spar 136 to the trunnion 134.

As discussed herein, the respective centerline 176 of each ply of the plurality of composite plies 163 is parallel, or non-parallel to each other ply of the composite plies 163 with a mis-alignment between 0 and 20 degrees. It will be appreciated that along the flared section 158, the respective centerlines 176 are also parallel to other portions of the airfoil assembly 130. As a non-limiting example, each respective centerline 176 is parallel to a plane 184, shown as removed for illustration, that extends along the inner surface 152 of the trunnion 134 that defines the flared section 158. It will be appreciated that the trunnion 134 is annular. As the plane 184 extends along the inner surface 152, the plane 184 is formed as a cone. That is, the inner surface 152 confronting the radially outermost ply 162 is parallel to the respective centerline 176 of the radially innermost ply 160 and the respective centerline 176 of the radially outermost ply 162. As a non-limiting example, the respective centerline 176 is parallel to a sleeve centerline 182 of the inner sleeve 172 that runs along the spar interior surface 157. It is contemplated in a non-limiting example, that the respective centerline 176 of each ply of the plurality of composite plies 163 is parallel to each other ply of the composite plies 163 across their full extent, however, that need not be the case.

After manufacturing of the airfoil assembly 130 (FIG. 3) or optionally after manufacturing of the spar 136 and trunnion 134, a non-destructive sensor 186 is configured to perform a non-destructive evaluation of the airfoil assembly 130; specifically of the flared section 158. The non-destructive sensor 186 can include evaluation methods such as acoustic imaging, ultrasound, X-rays, computer tomography (CT), magnetic resonance (MRI), X-ray, eddy current imaging, thermography, or non-imaging acoustic methods such as a contact A-scan or a tap test. The non-destructive sensor 186 emits a signal 188 through at least a portion of the airfoil assembly 130 which is used to image a respective portion of the airfoil assembly 130. The alignment of the respective centerlines 176, the plane 184 and the sleeve centerline 182, allows for a clean image to be generated through use of the non-destructive sensor 186. If the respective centerlines 176, the plane 184 and the sleeve centerline 182 were non-parallel, the image would be of low quality or otherwise be unable to be produced.

The signal 188 is any suitable signal such as, but not limited to, ultrasonic waves. The signal 188 is configured to reflect back into the non-destructive sensor 186. The non-destructive sensor 186 will evaluate inconsistencies in the wave pattern of the ultrasonic waves if there is a defect present. In a non-limiting example, the non-destructive sensor 186 can evaluate the spar 136 from one or both of the spar interior surface 157 or the spar exterior surface 159.

Figure 4:
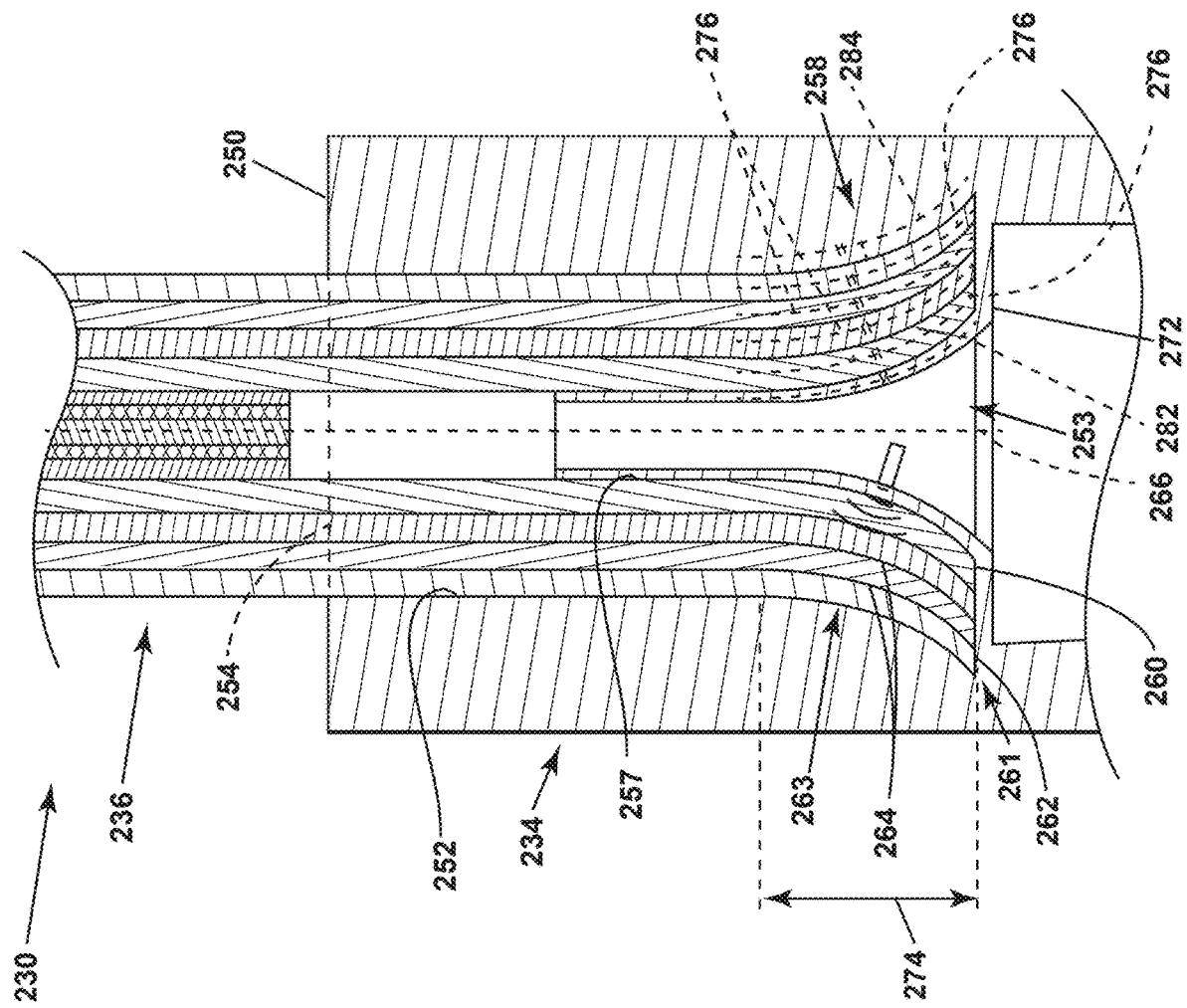
FIG. 4 is another exemplary schematic cross-sectional view of an airfoil assembly suitable for use as the airfoil assembly of FIG. 2, as seen from sectional line III-III of FIG. 2, further illustrating a set of composite plies forming a respective portion of the spar, the spar including a curved flared section.

FIG. 4 is a schematic cross-sectional view of an exemplary airfoil assembly 230 suitable for use as the airfoil assembly 130 of FIG. 2. The airfoil assembly 230 is similar to the airfoil assembly 130 (FIG. 2); therefore, like parts will be identified with like numerals increased to the 200 series with it being understood that the description of the airfoil assembly 130 applies to the airfoil assembly 230 unless noted otherwise.

The airfoil assembly 230 includes a trunnion 234 and a spar 236. The trunnion 234 includes a top surface 250 and an inner surface 252 defining a socket 253. The socket 253 has an opening 254 formed along the top surface 250. The spar 236 extends from the interior 148 of the airfoil body 132 (FIG. 2) and through the opening 254 into the socket 253. The spar 236 includes a spar centerline 266. The spar 236 includes a plurality of composite plies 263. The plurality of composite plies 263 includes, at least, a radially innermost ply 260 and a radially outermost ply 262.

The radially innermost ply 260 and the radially outermost ply 262 form a flared section 258. A set of intervening plies 264 are provided radially between the radially innermost ply 260 and the radially outermost ply 262. Further, the flared section 258 terminates at a distal end 261 within the socket 253. An inner sleeve 272 extends along the radially innermost ply 260 corresponding to at least the flared section 258.

In the non-limiting example shown, each ply of the plurality of composite plies 263 has a respective centerline 276. The respective centerline 276 of each ply of the plurality of composite plies 263 is parallel to each other ply of the composite plies 263. As a non-limiting example, the respective centerlines 276 are curved to define a curved section 274 of the spar 236. As a non-limiting example, the curved section 274 defines a curve that flares radially outward along a respective portion of the spar 236 and towards the distal end 261, with respect to the centerline 266.

As another non-limiting example, each respective centerline 276 is parallel to a plane 284, shown as removed for illustration, that extends along the inner surface 252 of the trunnion 234 that defines the flared section 258. As a non-limiting example, the respective centerline 276 is parallel to a sleeve centerline 282 of the inner sleeve 272 that runs along a spar interior surface 257.

The airfoil assembly 230 is similar to the airfoil assembly 130 of FIG. 3 in that the spar 236 has a flared section 258. The difference, however, is that the flared section 258 is non-linear and includes a curved surface. Put another way, the respective centerline 276, the plane 284, and the sleeve centerline 282 along the flared section 258 are non-linear. The non-linear flared section can include a constant curvature, as illustrated, or a non-constant curvature.

Benefits associated with the present disclosure include an airfoil assembly having a spar with a flared section where the parallel nature of the respective centerlines of the plies in the flared section allow for non-destructive inspection of the airfoil assembly. The parallel plies prevent the signal from interfering when reflected back to the non-destructive sensor. Instead, the signal will only indicate if there are any inconsistencies present within the airfoil assembly.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An airfoil assembly for an engine, the airfoil assembly comprising: an airfoil body comprising an outer wall bounding an interior, the outer wall extending between a leading edge and a trailing edge in a chordwise direction, and between a root and a tip in a spanwise direction; a trunnion defining a socket, the socket having an opening formed along a top surface; and a spar extending from the interior of the airfoil body and through the opening into the socket, the spar having a spar centerline and a flared section terminating at a distal end within the socket, the flared section being formed by a plurality of composite plies comprising: a radially innermost ply having a respective centerline; and a radially outermost ply having a respective centerline that is parallel to the respective centerline of the radially innermost ply.

The airfoil assembly of any preceding clause, wherein plurality of composite plies includes a set of intervening plies provided radially between the radially innermost ply and the radially outermost ply.

The airfoil assembly of any preceding clause, wherein each ply of the set of intervening plies includes a respective centerline parallel to the respective centerline of the radially innermost ply and the respective centerline of the radially outermost ply.

The airfoil assembly of any preceding clause, wherein the respective centerline of the radially innermost ply and the respective centerline of the radially outermost ply are parallel across their full extent.

The airfoil assembly of any preceding clause, further comprising an inner sleeve extending along at least a portion of the radially innermost ply.

The airfoil assembly of any preceding clause, wherein the inner sleeve includes a sleeve centerline that is parallel to the respective centerline of the radially innermost ply and the respective centerline of the radially outermost ply.

The airfoil assembly of any preceding clause, wherein the sleeve centerline is non-linear.

The airfoil assembly of any preceding clause, wherein the inner sleeve includes a metallic material.

The airfoil assembly of any preceding clause, wherein the inner sleeve extends along the distal end and connects to an inner surface of the trunnion.

The airfoil assembly of any preceding clause, wherein the inner sleeve is integrally formed with the trunnion.

The airfoil assembly of any preceding clause, wherein an inner surface confronting the radially outermost ply is parallel to the respective centerline of the radially innermost ply and the respective centerline of the radially outermost ply.

The airfoil assembly of any preceding clause, wherein the respective centerline of the radially innermost ply and the respective centerline of the radially outermost ply each include curved sections defined by a respective radius.

The airfoil assembly of any preceding clause, wherein the respective centerline of the radially innermost ply and the respective centerline of the radially outermost ply along the flared section are linear and extend at an angle with respect to the spar centerline, the angle being greater than 5 degrees and less than or equal to 45 degrees.

The airfoil assembly of any preceding clause, wherein the radially innermost ply defines a spar cavity that opens to the socket at the distal end.

The airfoil assembly of any preceding clause, wherein the spar cavity extends a cavity axial length with respect to the spar centerline, and the flared section extends a flared section axial length with respect to the spar centerline, the cavity axial length being greater than the flared section axial length.

The airfoil assembly of any preceding clause, wherein the plurality of composite plies forms an entirety of the spar.

The airfoil assembly of any preceding clause, wherein the plurality of composite plies include a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix.

The airfoil assembly of any preceding clause, wherein the engine is a turbine engine having a fan section, a compressor section, a combustion section and a turbine section in serial flow arrangement, with the airfoil assembly being provided within the fan section.

The airfoil assembly of any preceding clause, wherein the fan section comprises a plurality of exterior fan blades, with the airfoil assembly being provided within the plurality of exterior fan blades.

The airfoil assembly of any preceding clause, wherein the trunnion is rotatable about a pitch axis in a rotational direction such that the spar and the airfoil body are rotatable about the pitch axis.

The airfoil assembly of any preceding clause, wherein a non-destructive sensor emits a signal through at least a portion of the airfoil assembly An turbine engine comprising: a fan section, a compressor section, a combustion section and a turbine section in serial flow arrangement, with the airfoil assembly being provided in the fan section assembly; the airfoil assembly comprising: an airfoil body comprising an outer wall bounding an interior, the outer wall extending between a leading edge and a trailing edge in a chordwise direction, and between a root and a tip in a spanwise direction; a trunnion defining a socket, the socket having an opening formed along a top surface; and a spar extending from the interior of the airfoil body and through the opening into the socket, the spar having a spar centerline and a flared section terminating at a distal end within the socket, the flared section being formed by a plurality of composite plies comprising: a radially innermost ply having a respective centerline; and a radially outermost ply having a respective centerline that is parallel to the respective centerline of the radially innermost ply.

The turbine engine of any preceding clause, wherein plurality of composite plies includes a set of intervening plies provided radially between the radially innermost ply and the radially outermost ply.

The turbine engine of any preceding clause, wherein each ply of the set of intervening plies includes a respective centerline parallel to the respective centerline of the radially innermost ply and the respective centerline of the radially outermost ply.

The turbine engine of any preceding clause, wherein the respective centerline of the radially innermost ply and the respective centerline of the radially outermost ply are parallel across their full extent.

The turbine engine of any preceding clause, further comprising an inner sleeve extending along at least a portion of the radially innermost ply.

The turbine engine of any preceding clause, wherein the inner sleeve includes a sleeve centerline that is parallel to the respective centerline of the radially innermost ply and the respective centerline of the radially outermost ply.

The turbine engine of any preceding clause, wherein the sleeve centerline is non-linear.

The turbine engine of any preceding clause, wherein the inner sleeve includes a metallic material.

The turbine engine of any preceding clause, wherein the inner sleeve extends along the distal end and connects to an inner surface of the trunnion.

The turbine engine of any preceding clause, wherein the inner sleeve is integrally formed with the trunnion.

The turbine engine of any preceding clause, wherein an inner surface confronting the radially outermost ply is parallel to the respective centerline of the radially innermost ply and the respective centerline of the radially outermost ply.

The turbine engine of any preceding clause, wherein the respective centerline of the radially innermost ply and the respective centerline of the radially outermost ply each include curved sections defined by a respective radius.

The turbine engine of any preceding clause, wherein the respective centerline of the radially innermost ply and the respective centerline of the radially outermost ply along the flared section are linear and extend at an angle with respect to the spar centerline, the angle being greater than 5 degrees and less than or equal to 45 degrees.

The turbine engine of any preceding clause, wherein the radially innermost ply defines a spar cavity that opens to the socket at the distal end.

The turbine engine of any preceding clause, wherein the spar cavity extends a cavity axial length with respect to the spar centerline, and the flared section extends a flared section axial length with respect to the spar centerline, the cavity axial length being greater than the flared section axial length.

The turbine engine of any preceding clause, wherein the plurality of composite plies forms an entirety of the spar.

The turbine engine of any preceding clause, wherein the plurality of composite plies include a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix.

The turbine engine of any preceding clause, wherein the engine is a turbine engine having a fan section, a compressor section, a combustion section and a turbine section in serial flow arrangement, with the airfoil assembly being provided within the fan section.

The turbine engine of any preceding clause, wherein the fan section comprises a plurality of exterior fan blades, with the airfoil assembly being provided within the plurality of exterior fan blades.

The turbine engine of any preceding clause, wherein the trunnion is rotatable about a pitch axis in a rotational direction such that the spar and the airfoil body are rotatable about the pitch axis.

The turbine engine of any preceding clause, wherein a non-destructive sensor emits a signal through at least a portion of the airfoil assembly.

What is claimed is:

1. An airfoil assembly for an engine, the airfoil assembly comprising:
    an airfoil body comprising an outer wall bounding an interior, the outer wall extending between a leading edge and a trailing edge in a chordwise direction, and between a root and a tip in a spanwise direction;
    a trunnion defining a socket, the socket having an opening formed along a top surface;
    a spar extending from the interior of the airfoil body and through the opening into the socket, the spar having a spar centerline and a flared section terminating at a distal end within the socket, the flared section being formed by a plurality of composite plies comprising:
      a radially innermost ply having a respective centerline; and
      a radially outermost ply having a respective centerline that is parallel to the respective centerline of the radially innermost ply; and
    an inner sleeve extending along at least a portion of the radially innermost ply, the inner sleeve having a sleeve centerline that is parallel to the respective centerline of the radially innermost ply and the respective centerline of the radially outermost ply.

2. The airfoil assembly of claim 1, wherein the plurality of composite plies includes a set of intervening plies provided radially between the radially innermost ply and the radially outermost ply.

3. The airfoil assembly of claim 2, wherein each ply of the set of intervening plies includes a respective centerline parallel to the respective centerline of the radially innermost ply and the respective centerline of the radially outermost ply.

4. The airfoil assembly of claim 3, wherein the respective centerline of the radially innermost ply and the respective centerline of the radially outermost ply are parallel across their full extent.

5. The airfoil assembly of claim 1, wherein the sleeve centerline is non-linear.

6. The airfoil assembly of claim 1, wherein the inner sleeve includes a metallic material.

7. The airfoil assembly of claim 1, wherein the inner sleeve extends along the distal end and coupled to an inner surface of the trunnion.

8. The airfoil assembly of claim 1, wherein the inner sleeve is integrally formed with the trunnion.

9. The airfoil assembly of claim 1, wherein an inner surface of the trunnion confronting the radially outermost ply is parallel to the respective centerline of the radially innermost ply and the respective centerline of the radially outermost ply.

10. The airfoil assembly of claim 1, wherein the respective centerline of the radially innermost ply and the respective centerline of the radially outermost ply each include a curved section defined by a respective radius.

11. The airfoil assembly of claim 1, wherein the respective centerline of the radially innermost ply and the respective centerline of the radially outermost ply along the flared section are linear and extend at an angle with respect to the spar centerline, the angle being greater than 5 degrees and less than or equal to 45 degrees.

12. The airfoil assembly of claim 1, wherein the radially innermost ply defines a spar cavity that opens to the socket at the distal end.

13. The airfoil assembly of claim 12, wherein the spar cavity extends a cavity axial length with respect to the spar centerline, and the flared section extends a flared section axial length with respect to the spar centerline, the cavity axial length being greater than the flared section axial length.

14. The airfoil assembly of claim 1, wherein the plurality of composite plies forms an entirety of the spar.

15. The airfoil assembly of claim 1, wherein the plurality of composite plies includes a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix.

16. The airfoil assembly of claim 1, wherein the engine is a turbine engine having a fan section, a compressor section, a combustion section and a turbine section in serial flow arrangement, with the airfoil assembly being provided within the fan section.

17. The airfoil assembly of claim 16, wherein the fan section comprises a plurality of exterior fan blades, with the airfoil assembly being provided within the plurality of exterior fan blades.

18. The airfoil assembly of claim 1, wherein the trunnion is rotatable about a pitch axis in a rotational direction such that the spar and the airfoil body are rotatable about the pitch axis.

19. The airfoil assembly of claim 1, wherein a non-destructive sensor emits a signal through at least a portion of the airfoil assembly.

20. The airfoil assembly of claim 19, wherein the non-destructive sensor includes at least one evaluation method of: acoustic imaging, ultrasound, X-rays, computer tomography (CT), magnetic resonance (MRI), X-ray, eddy current imaging, thermography, or non-imaging acoustic methods such as a contact A-scan or a tap test.

* * * * *